(12) United States Patent
Ruiz et al.

(10) Patent No.: US 12,169,743 B2
(45) Date of Patent: *Dec. 17, 2024

(54) SINGLE DEVICE INDEPENDENT BACKEND INTERFACE TO A FRONTEND INTERFACE OF A MICROSERVICE

(71) Applicant: NCR Voyix Corporation, Atlanta, GA (US)

(72) Inventors: Francis Dalman Ruiz, Cebu (PH); Al Ryan Bia Bacalso, Cebu (PH); Joel Mulle Pescante, Cebu (PH); Rydel Fernandez Siono, Minglanilla (PH)

(73) Assignee: NCR Voyix Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/519,745

(22) Filed: Nov. 27, 2023

(65) Prior Publication Data

US 2024/0095110 A1    Mar. 21, 2024

Related U.S. Application Data

(63) Continuation of application No. 17/231,135, filed on Apr. 15, 2021, now Pat. No. 11,829,810.

(51) Int. Cl.
*G06F 9/54* (2006.01)
*H04L 43/50* (2022.01)
*H04L 67/75* (2022.01)

(52) U.S. Cl.
CPC .............. *G06F 9/547* (2013.01); *H04L 43/50* (2013.01); *H04L 67/75* (2022.05)

(58) Field of Classification Search
CPC .............. G06F 16/2379; G06F 11/0757; G06F 11/0793; G06Q 20/10; G06Q 20/389; G06Q 20/425
See application file for complete search history.

(56) References Cited

U.S. PATENT DOCUMENTS

| | | | | |
|---|---|---|---|---|
| 2018/0067903 | A1* | 3/2018 | Maker | G06F 40/106 |
| 2019/0004871 | A1* | 1/2019 | Sukhomlinov | G06F 9/541 |
| 2019/0306138 | A1* | 10/2019 | Carru | H04L 63/10 |
| 2020/0274900 | A1* | 8/2020 | Vaishnavi | H04L 63/20 |
| 2021/0192535 | A1* | 6/2021 | Lee | G06F 16/2379 |
| 2021/0406851 | A1* | 12/2021 | Phukan | G06Q 20/18 |
| 2022/0076240 | A1* | 3/2022 | Ghani | G06Q 20/4014 |
| 2022/0398926 | A1* | 12/2022 | Vossoughi | G07C 9/27 |

OTHER PUBLICATIONS

"U.S. Appl. No. 17/231,135, Notice of Allowance mailed Jul. 26, 2023", 9 pgs.

* cited by examiner

*Primary Examiner* — Mahran Y Abu Roumi
(74) *Attorney, Agent, or Firm* — Schwegman Lundberg & Woessner, P.A.

(57) ABSTRACT

An Application Programming Interface (API) is provided for interaction between a User Interface (UI) of a device and microservices provided from a cloud processing environment. The API provides a single device-type independent backend to the frontends of the microservices. The UI defines the data types and specific data that it needs for processing from a given microservice. The backend calls the appropriate microservice through the corresponding frontend of the microservice. The microservice may engage other microservices resulting in output being returned to the backend. The backend provides only the output associated with the data types and the specific data back to the UI.

20 Claims, 3 Drawing Sheets

SINGLE DEVICE INDEPENDENT BACKEND INTERFACE TO A FRONTEND INTERFACE OF A MICROSERVICE

CROSS-REFERENCE TO RELATED APPLICATION

This application is a continuation of U.S. patent application Ser. No. 17/231,135, filed Apr. 15, 2021, which application and publication is incorporated herein by reference in its entirety.

BACKGROUND

Microservices are associated with a computing architecture that structures a single application/service as a collection of loosely coupled services. This allows each of microservices that represents the single application/service to be independently deployed even when the overall single application/service is complex. Microservices are also easy to maintain and to test. Each microservice provides fine-grain functionality associated with a portion of the single application/service. Each microservice is loosely coupled to the other microservices because the degree of dependence between the microservices associated the single application/service is small and substantially smaller than what is associated with the coupling/dependencies between the original functions of the original single application/service.

Unsurprisingly, enterprises are migrating their applications/services architectures and newly provided services to be delivered to their customers over networks as microservices. Microservices allow enterprises to provide their customer services over a variety of customer device types and Operating System (OS) platforms from a single set of core cooperating cloud-based functions.

However, each supported device type has different requirements associated with its user-facing interface. For example, a mobile phone interface simply cannot provide the same degree of information and options as that which can be provided via a a transaction terminal interface (i.e., the display screen on a phone is substantially smaller than a transaction terminal). As a result, each device type interface usually requires its own specific set of source code that is designed to act as an intermediary between the customer's device and a given microservice. It makes no sense to clutter the microservices with device type and interface specific source code because this would defeat the purposes of the microservice and incorporate device and platform specific limitation into the source code of the microservice.

As a result, the interfaces usually have to interact with a device-specific backend service, which translates between the device interface and the microservice. The device-specific backend service may be part of the device interface or may be server based. An enterprise must maintain these backend services for each different type of device capable of accessing the microservices. That is, a backend manages interactions with the microservices and delivers just the information needed by the device that initiated a given microservice.

Consequently, enterprises now find that managing the backend services is challenging. Additionally, Representational State Transfer (REST) interface protocols are commonly used to access cloud-based services from a User Interface (UI), but REST protocols return all the data produced as output by a requested cloud service to a requesting UI and it is the responsibility of the UI to filter out returned data that is unwanted, unnecessary, and superfluous. There is no mechanism by which the UI can define what specific data is returned to it from the cloud service. This has ensured that backend services are needed based on device types associated with the UIs and such backend service must be interposed between the UIs and the Rest provided response from the cloud service.

SUMMARY

In various embodiments, methods and a system for providing a single device independent backend interface to a frontend interface of a microservice (MS) are presented.

According to an embodiment, a method for providing a providing a single device independent backend interface to a frontend interface of a MS is presented. A call is received; the call is being directed to a MS from a User Interface (UI). Expected output data types that are expected by the UI and that are supported by the UI based in least in part on a device type associated with a device of the UI are identified. Output data is obtained from the MS and/or other MSs based on the MS and/or other MSs processing the call. A selective portion of the output data is identified based on the expected output data types. The selective portion of the output data is provided back to the UI as a response to the call that the UI originally directed to the MS.

DETAILED DESCRIPTION

Figure 1:
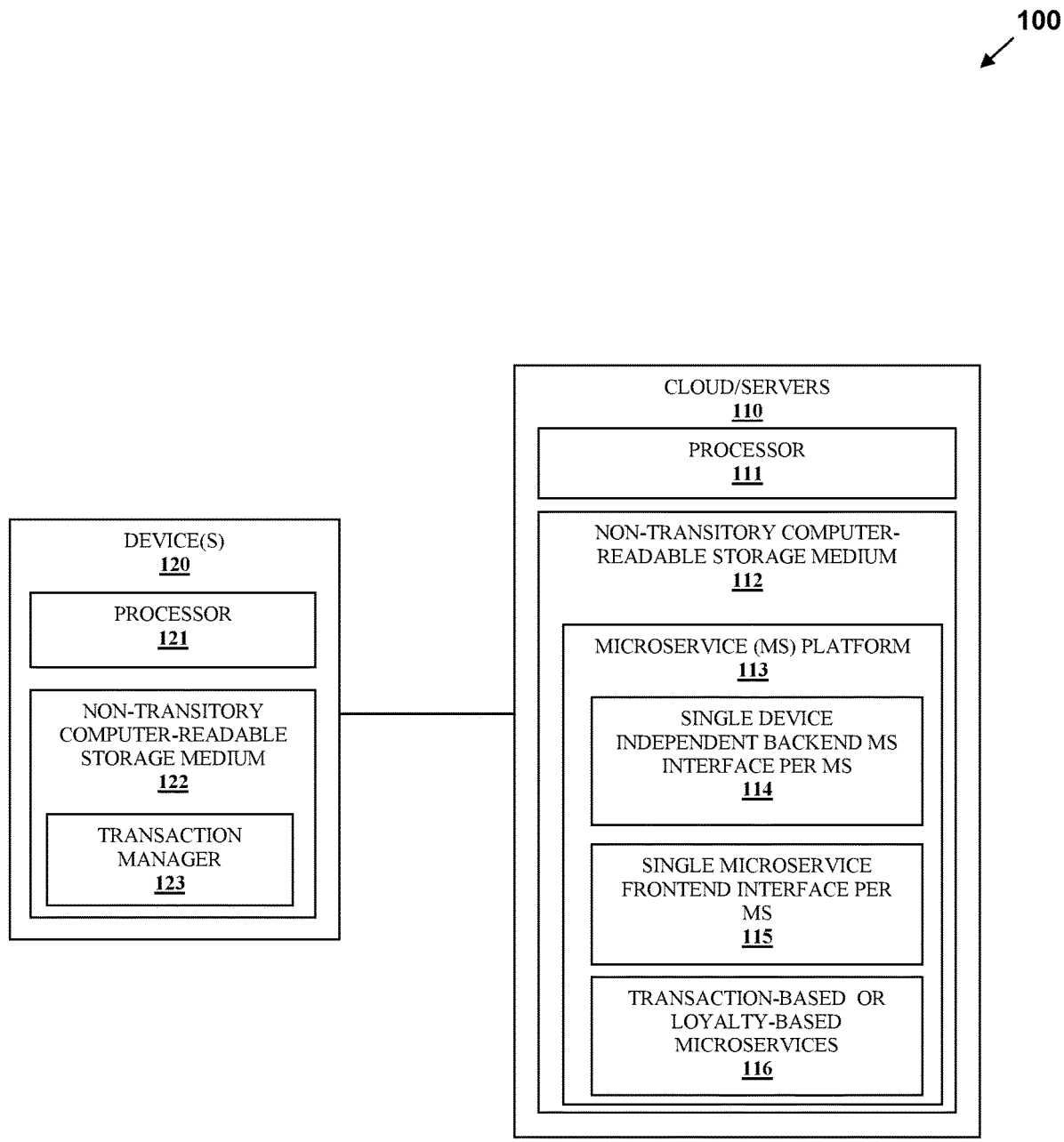
FIG. 1 is a diagram of a system for providing a providing a single device independent backend interface to a frontend interface of a MS, according to an example embodiment.

FIG. 1 is a diagram of a system 100 for providing a providing a single device independent backend interface to a frontend interface of a MS, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or fewer components are possible without departing from the teachings of providing a providing a single device independent backend interface to a frontend interface of a MS, presented herein and below.

As will be demonstrated herein and below, a single backend application is provided for a single frontend application of a microservice within a microservice cloud-based architecture. The single backend application is provided for all device types being supported in the architecture along with the UIs of the devices. The conventional approach that required a specific backend for each device type required an abundance of source code and modules that required support and that led to greater failure and error rates in a microservice architecture. The approach provided herein eliminates the conventional requirements and provides a single backend application that handles all architectural supported device types and their UIs for interaction with frontend applications of microservices.

As used herein, the terms "user," "operator," "customer," and "consumer" may be used synonymously and interchangeably. This refers to a person who is operating a device and that device's UI for purpose of obtaining services provided by microservices from a cloud processing environment (hereinafter just "cloud").

As discussed herein and below, a "microservice" is one or more functions/operations decoupled from a particular service. The particular service is comprised of multiple functions/operations defined by multiple microservices cooperating with one another to provide the overall functions/operations of the particular service. The particular service may be a transaction service, a loyalty service, a reservation service, a payment service, and/or a security service. The particular service is processed from or initiated at a Point-of-Sale (POS) terminal, a Self-Service Terminal (SST), an Automated Teller Machine (ATM), a kiosk, a phone, a desktop, a laptop, a tablet, and/or a wearable processing device. The particular service is decomposed into loosely coupled operations/functions that comprise the cooperating microservices. Each microservice may process on a same or different computing device from remaining ones of of combinations of the microservices. Each device that processes one or more of the microservices may be a server, a VM, a container, the terminal where the particular service was initiated, or any other computing device. In this manner, the functions/operations of the particular service are distributed by the cooperating microservices over multiple devices, a same device, or combinations of these, such that the microservices are accessible via a cloud from the perspective of the user who requests or causes the microservices to perform their operations. Furthermore, each microservice may natively execute on a same or different platform from remaining ones of the microservices. In this way, the microservices are device and platform independent or agnostic.

System 100 comprises a cloud/servers 110 and a plurality of user-operated devices.

Cloud/Servers 110 can comprise a variety of different devices that are logically organized and cooperating as a single addressed and accessible network server. Each device comprises a processor 111 and a non-transitory computer-readable storage medium 112. Medium 112 comprises executable instructions for a single independent backend microservice (MS) per MS application 114 (hereinafter just backend 114 or backend Application Programming Interface (API) 114), a single MC frontend interface per MS app 115 (hereinafter just frontend 115 or frontend app 115), and a plurality of transaction-based or loyalty based MSs 116 (hereinafter just MSs 116). When the executable instructions are provided to processor 111 from medium 112, this causes processor 111 to perform operations discussed herein and below for 114-116. When executing the instructions, processor 111 defines within medium 112 a microservice platform processing environment 113.

Each user-operated device 120 (hereinafter just device 120) comprises a processor 121 and a non-transitory computer-readable storage medium 122. Medium 122 comprises executable instructions for a transaction manager 123. When the executable instructions are provided to processor 121 from medium 122, this causes processor 121 to perform operations discussed herein and below for 122-123.

Transaction manager 123 includes a user or operator facing interface that receives transaction inputs from device peripherals of from an operator of device 120 during a transaction. Transaction manager 123 also provides transaction produced outputs through transaction screens rendered for the operator facing interface on a display of device 120. The transaction inputs are sent over a network connection to microservices 115 for processing operations or functions based on the transaction inputs and producing the transaction outputs. The outputs are delivered back to transaction manager 123 and presented through the operator facing interface to the device 120 for viewing by or for further interaction by operator/user during the transaction.

Conventionally, the transaction inputs are provided to a specific backend based on a device type associated with device 120. This is achieved by the backend being part of the transaction manager or by a proxy that redirects a MS call from the transaction manager to the appropriate backend. The backend then provides the transaction manager call to the appropriate MS and receives output from that MS or other MSs that participated in processing the transaction inputs or partial outputs generated by some of the MS.

The above-referenced conventional processing is changed with system 100. Transaction manager 123 issues a MS call and the call is intercepted or is directly provided to single backend 114 without regard to any device type of device 120. As part of the call between transaction manager 123 and backend 114 a device identifier for device 120 is provided (may also be any identifier such as Internet Protocol (IP) address, version number of transaction manager 123, etc.). The identifier is used to determine the device type of device 120. Such that when the MSs 115 respond with transaction output data, the data types associated with the transaction output data is automatically selected based on what is expected by and handled by a device type of device 120 having transaction manager 123. That is, the specific portions of output data that is needed by the operator facing interface of transaction manager 123 based on the device type are selected from the transaction output data produced by the MSs 115. The backend 114 then returns the specific portions to transaction manager 123. Manager 123 then generates corresponding transaction screens and/or updates existing transaction screens rendered within the operator facing interface for viewing and interaction by the operator.

In an embodiment, backend 114 is provided as an API with transaction manager 123 providing API calls via a web-based protocol to define the specific data and data types required by transaction manager 123 when calls are made to MSs 115.

For example, backend 114 may be implemented through a GraphQL API providing a web-based protocol for data querying and data manipulation. Here, the initial call by transaction manager 123 for a given MS 116 uses the API with the initial MS call to define the structure of the output data from the MSs 115 that are expected and that are needed by transaction manager 123. So, backend 114 is an API 113 that pushes the specific needs of output data by device 120 onto transaction manager 123 through API calls issued with the MS calls. In this embodiment, the GraphQL replaces any existing REST API that may have been previously used by transaction manager 123 when making a call to a given MS 116.

Control over what is needed from transaction output is given to transaction manager 123 based on a device type associated with device 120. There is no need to have specialized application or backends for each separate device type serviced by MSs 115. Backend 114 may be provided as an API that is processed via a web-based protocol from calls initiated on device 120 and processed on cloud/servers 110.

Backend 114 issues the transaction manager 123 calls directed to MSs 115 to the corresponding frontends 114 causing frontends 114 to provide any transaction input data and to provide operation identifiers for specific operations to the corresponding MSs 115. Each MS 116 performs its designated operation, which may entail calling another MS 116; each processed MS 116 provides its portion of the transaction output data to its frontend 115 and the transaction output data is aggregated by backend 114. Backend 114 then delivers the corresponding data types and specific portions of the output data back to transaction manager 123. Superfluous or unneeded output data is ignored or discarded by backend 114.

The source code associated with transaction manager 123 only has to account for and processing the transaction output data that it expects to see and expects to process. There is no need for the source code of transaction manager 123 to account for and handle data and data types associated with superfluous portions of the output data produced and provided by the MSs 115. This makes the source code of transaction manager 123 less verbose and less error prone making support and maintenance of the source code for transaction manager 123 and for the cloud/servers 110 easier to manage over what has conventionally been the case with RESTful interfaces and specialized backends for each device type supported by an enterprise for its customers.

In an embodiment, device 120 is a phone, a tablet, a laptop, a SST, an ATM, a POS terminal, a wearable processing device, or a kiosk.

In an embodiment,

The above-noted embodiments and other embodiments are now discussed with reference to FIGS. 2-3.

Figure 2:
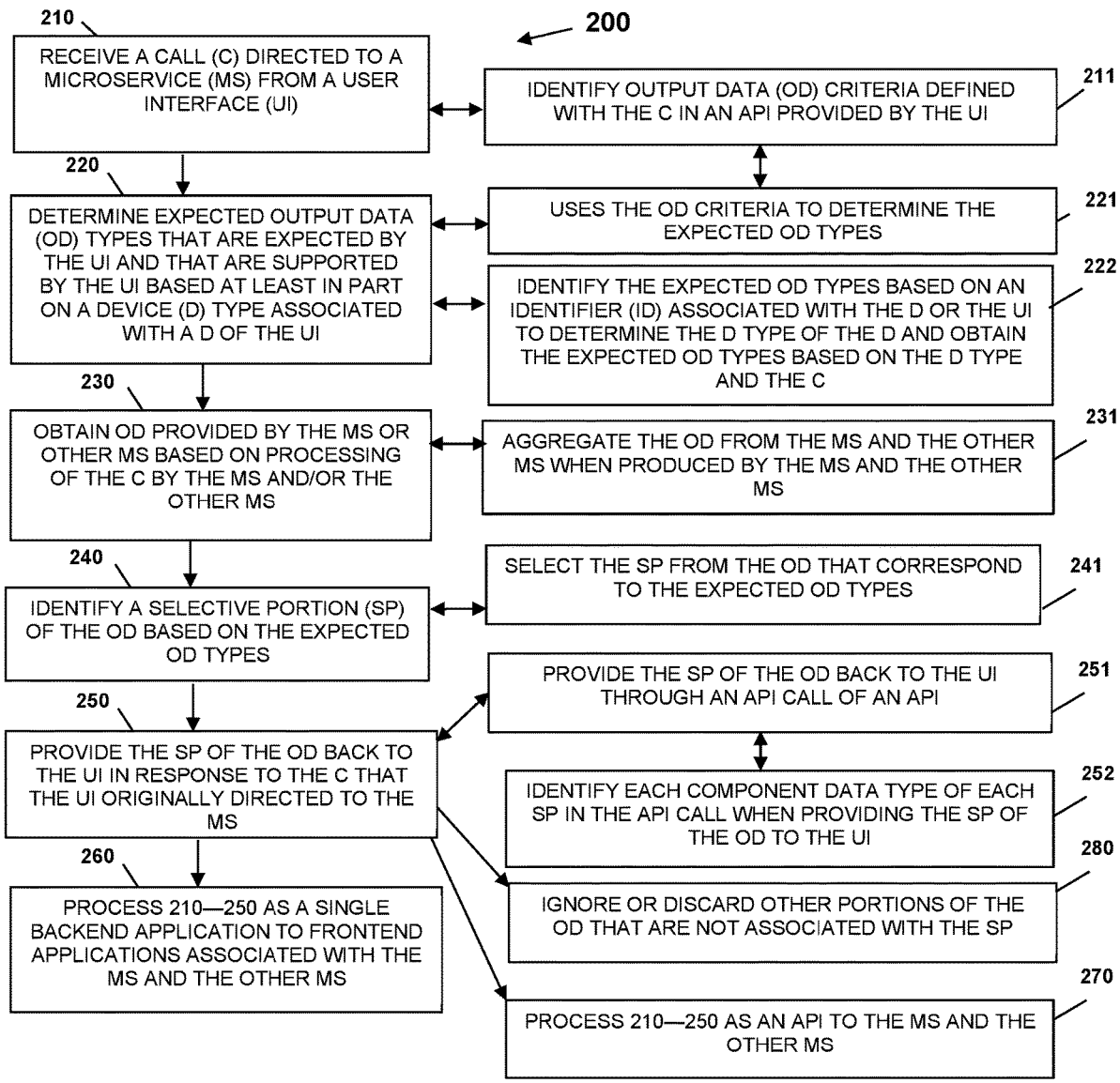
FIG. 2 is a diagram of a method for providing a providing a single device independent backend interface to a frontend interface of a MS, according to an example embodiment.

FIG. 2 is a diagram of a method 200 for providing a providing a single device independent backend interface to a frontend interface of a MS, according to an example embodiment. The software module(s) that implements the method 200 is referred to as a "UI backend to microservice frontend manager." The UI backend to microservice frontend manager is implemented as executable instructions programmed and residing within memory and/or a non-transitory computer-readable (processor-readable) storage medium and executed by one or more processors of a device or set of devices. The processor(s) of the device(s) that executes the UI backend to microservice frontend manager are specifically configured and programmed to process the UI backend to microservice frontend manager. The UI backend to microservice frontend manager may have access to one or more network connections during its processing. The network connections can be wired, wireless, or a combination of wired and wireless.

In an embodiment, the UI backend to microservice frontend manager executes on cloud 110.

In an embodiment, the UI backend to microservice frontend manager executes on servers 110.

In an embodiment, the UI backend to microservice frontend manager is all or some combination of 113, 114, 115, and/or 116.

At 210, UI backend to microservice frontend manager receives a call directed to a microservice from a UI (e.g., operator facing interface of transaction manager 123).

In an embodiment, at 211, the UI backend to microservice frontend manager identifies output data criteria defined with the call within an API provided by the UI.

At 220, the UI backend to microservice frontend manager determines expected output data types that are expected by the UI and that are supported by the UI based at least in part on a device type associated with a device 120 of the UI.

In an embodiment of 220 and 211, at 221, the UI backend to microservice frontend manager uses the output data criteria to determine the expected output data types.

In an embodiment, at 222, the UI backend to microservice frontend manager identifies the expected output data types based on an identifier associated with the device 120 or based on a version number associated with the UI to determine the device type of device 120 and to obtain the expected output data types based on the device type and the call.

At 230, the UI backend to microservice frontend manager obtains output data provided by the MS or other MSs based on processing of the call by the MS and/or the other MSs.

In an embodiment, at 231, the UI backend to microservice frontend manager aggregates the output data from the MS and the other MSs as the output data is produced by the MS and the other MSs.

At 240, the UI backend to microservice frontend manager identifies a selective portion of the output data based on the expected output data types.

In an embodiment, at 241, the UI backend to microservice frontend manager selects the selective portions from the output data that correspond to the expected output data types.

At 250, the UI backend to microservice frontend manager provides the selective portions of the output data back to the UI in response to the call that the UI originally directed to the MS.

In an embodiment, at 251, the UI backend to microservice frontend manager provides the selective portions of the output data back to the UI through an API call of an API.

In an embodiment of 251 and at 252, the UI backend to microservice frontend manager identifies each component data type of each selective portion in the API call when providing the selective portions of the output data to the UI.

In an embodiment, at 260, the UI backend to microservice frontend manager is processed as a single backend application or service to frontend applications or services associated with the MS and the other MSs.

In an embodiment, at 270, the UI backend to microservice frontend manager is processed as an API to the MS and the other MSs.

In an embodiment, at 280, the UI backend to microservice frontend manager ignores or discards other portions of the output data that are not associated with the selective portions of the output data.

Figure 3:
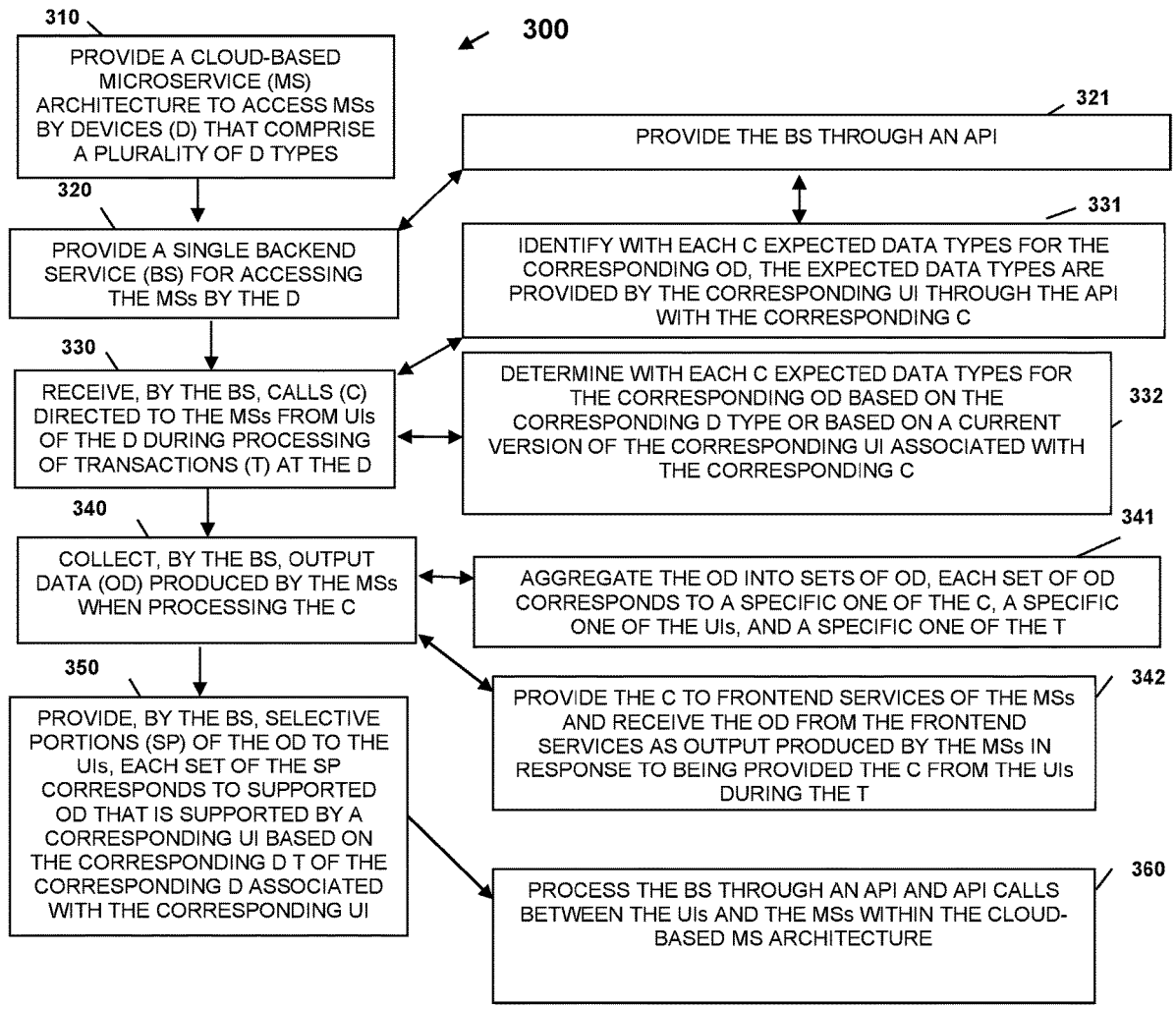
FIG. 3 is a diagram of another method for providing a providing a single device independent backend interface to a frontend interface of a MS, according to an example embodiment

FIG. 3 is a diagram of another method 300 for providing a providing a single device independent backend interface to a frontend interface of a MS, according to an example embodiment. The software module(s) that implements the method 300 is referred to as a "microservice platform controller" The microservice platform controller is implemented as executable instructions programmed and residing within memory and/or a non-transitory computer-readable (processor-readable) storage medium and executed by one or more processors of a device or set of devices. The processor(s) of the device that executes the microservice platform controller are specifically configured and programmed to process the microservice platform controller. The microservice platform controller may have access to one or more network connections during its processing. The network connections can be wired, wireless, or a combination of wired and wireless.

In an embodiment, the device that executes the microservice platform controller is cloud 110, servers 110, and/or a combination of cloud 110 and devices 120.

In an embodiment, the microservice platform controller is all or some combination of 113, 114, 115, 116, 123, and/or method 200.

The microservice platform controller presents another and, in some ways, enhanced processing perspective from that which was discussed above for method 200 of FIG. 2.

At 310, microservice platform controller provides a cloud-based MS architecture (which comprises platform 113) to access MSs 116 by devices 120 that comprise a plurality of device types.

At 320, the microservice platform controller provides a single backend service 114 for accessing the MSs 116 by the devices 120.

In an embodiment, at 321, the microservice platform controller provides the single backend service 114 through an API.

At 330, the backend service 114 receives calls directed to the MSs 116 from UIs (e.g., operating facing interfaces of transaction managers 123) of the devices 120 during processing of transactions at the device 120.

In an embodiment of 321 and 330, at 331, the backend service 114 identifies with each call expected data types for the corresponding output data. The expected data types are provided by the corresponding UI through the API with the corresponding call.

In an embodiment, at 332, the backend service 114 determines with each call expected data types for the corresponding output data based on the corresponding device type or based on a current version number of the corresponding UI associated with the corresponding call.

At 340, the backend service 114 collects output data provided by the MSs 116 when processing the calls.

In an embodiment, at 341, the backend service 114 aggregates the output data into sets of output data. Each set of output data corresponds to a specific one of the calls, a specific one of the UIs, and a specific one of the transactions.

In an embodiment, at 342, the backend service 114 provides the calls to frontend services 115 of the MSs 116 and the backend service 114 receives the output data from the frontend services 115 as output that was produced by the MSs 116 in response to being provided the calls from the UIs during the transactions.

At 350, the backend service 114 provides selective portions of the output data to the UIs. Each set of selective portions corresponds to supported output data that is supported by a corresponding UI based on the corresponding device type of the corresponding device 120 associated with the corresponding UI.

In an embodiment, at 360, the microservice platform controller processes the backend service 114 through an API and API calls between the UIs and the MSs 116 within a cloud-based MS architecture or platform 113.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
receiving, at a backend service, a call directed to a microservice from a user interface (UI) of a device;
determining, by the backend service, expected output data types supported by the UI based on a device type of the device;
providing the call from the backend service to the microservice;
receiving output data from the microservice at the backend service;
identifying, by the backend service, portions of the output data corresponding to the expected output data types; and
providing the identified portions of the output data from the backend service to the UI.

2. The method of claim 1, wherein receiving the call further includes receiving an application programming interface (API) call including parameters specifying the expected output data types supported by the UI.

3. The method of claim 1, wherein determining the expected output data types further includes determining, based on the device type, that the UI has limited display screen real estate.

4. The method of claim 1, wherein providing the call further includes providing the call to a frontend service associated with the microservice.

5. The method of claim 1, wherein receiving the output data further includes receiving the output data from a plurality of microservices including the microservice.

6. The method of claim 1 further comprising:
aggregating the output data from the microservice and any additional microservices that processed the call.

7. The method of claim 1, wherein identifying the portions of the output data further includes excluding portions of the output data corresponding to other data types not supported by the UI.

8. The method of claim 1, wherein providing the identified portions further includes providing the portions of the output data via an application programming interface (API) call to the UI.

9. The method of claim 1, wherein the device type is associated with at least one of: a mobile phone, a tablet computer, a laptop computer, a wearable computing device, a self-service terminal, an automated teller machine, a point-of-sale terminal, or a kiosk.

10. The method of claim 1, wherein the microservice is associated with at least one of: a transaction service, a payment service, a loyalty service, a security service, or a reservation service.

11. The method of claim 1 further comprising:

storing, at the backend service, mappings between a plurality of device types and corresponding executed output data types supported by a plurality of UIs of a plurality of devices of a plurality of device types, wherein determining the expected output data types supported by the UI is based on the stored mappings.

12. A method, comprising:

maintaining, at a backend service, mappings between a plurality of device types and expected output data types supported by user interfaces (UIs) of devices of the plurality of device types;

receiving a call directed to a microservice from a certain UI of a certain device at the backend service;

identifying a certain device type of the certain device;

determining certain executed output data types supposed by the certain UI based on the identified certain device type and the mappings;

providing the call from the backend service to the microservice;

identifying portions of the output data corresponding to the determined certain executed output data types supported by the certain UI; and providing the identified portions of the output data from the backend service to the certain UI.

13. The method of claim 12, wherein maintaining the mappings further includes storing the mapping in a data store accessible to the backend service.

14. The method of claim 12 further comprising:

updating the mappings based on receiving a new device type and corresponding expected output data types supported.

15. The method of claim 12, wherein providing the identified portions of the output data to the UI further includes formatting the identified portions based on display capabilities of the UI.

16. The method of claim 12 further comprising:

applying additional processing to the output data to tailor the output data for a display associated with the UI of the device type.

17. The method of claim 12, wherein identifying the device type of the device further includes retrieving an identifier of the device type from the call.

18. The method of claim 12, wherein the microservice includes a transaction service, a loyalty service, a payment service, a security service, or a reservation service of a cloud-based microservice architecture accessible to the devices of the plurality of device types.

19. A system, comprising:

one or more processors; and a memory storing instructions that, when executed by the one or more processors, cause the one or more processors to perform operations comprising:

receiving a call directed to a microservice from a user interface (UI) of a device;

determining expected output data types supported by the UI based on a device type of the device;

providing the call to the microservice;

receiving output data from the microservice;

identifying portions of the output data corresponding to the expected output data types; and providing the identified portions of the output data to the UI.

20. The system of claim 19, wherein determining the expected output data types supported by the UI further includes analyzing historical usage data associated with the device type indicating previous output data types utilized by other UIs of other devices of the device type.

* * * * *